United States Patent [19]

Nakatomi et al.

[11] Patent Number: 5,674,025

[45] Date of Patent: Oct. 7, 1997

[54] ELECTRONIC DEVICE WITH FEMALE SCREW AND STRUCTURE FOR MOUNTING THE ELECTRONIC DEVICE IN THE INTERIOR OF AN AUTOMOBILE

[75] Inventors: Yoshiyuki Nakatomi; Yasushi Shibuya, both of Iwaki, Japan

[73] Assignee: Alpine Electronics, Inc., Tokyo, Japan

[21] Appl. No.: 539,037

[22] Filed: Oct. 4, 1995

[30] Foreign Application Priority Data

Oct. 5, 1994 [JP] Japan .................................. 6-268324

[51] Int. Cl.⁶ ...................................................... B25G 3/00
[52] U.S. Cl. .......................... 403/343; 403/398; 403/399; 411/437; 361/814; 307/10.1
[58] Field of Search .................................. 403/398, 399, 403/343; 411/437, 527, 174, 175; 361/814; 307/10.1

[56] References Cited

U.S. PATENT DOCUMENTS

| | | | |
|---|---|---|---|
| 2,408,573 | 10/1946 | Morehouse | 411/527 X |
| 2,986,059 | 5/1961 | Duffy et al. | 411/437 |
| 3,207,022 | 9/1965 | Tinnerman | 411/527 |
| 3,212,391 | 10/1965 | Duffy | 411/437 X |
| 3,464,308 | 9/1969 | Dohmeier | 411/437 |
| 3,491,646 | 1/1970 | Tinnerman | 411/437 X |
| 3,570,361 | 3/1971 | Tinnerman | 411/437 |
| 3,583,274 | 6/1971 | Duffy | 411/437 X |
| 5,381,684 | 1/1995 | Kawamura | 361/814 X |

*Primary Examiner*—Blair Johnson
*Assistant Examiner*—Bruce A. Lev
*Attorney, Agent, or Firm*—Guy W. Shoup; Patrick T. Bever

[57] ABSTRACT

An electronic device mounting structure, which allows threaded engagement with a standardized male screw compliant with the JIS, DIN or the like without having to perform tapping on a plate material, includes an engagement hole having first and second cutouts formed in a peripheral edge section thereof, wherein the peripheral edge section of the engagement hole is deformed in the plate thickness direction such that there is a positional deviation from a first peripheral edge end section bordering on the first cutout toward a second peripheral edge section bordering on the second cutout by approximately one half of the pitch of a standardized male screw compliant with the JIS and a further positional deviation from a third peripheral edge end section bordering on the second cutout toward a fourth peripheral edge end section bordering on the first cutout by approximately one half of the pitch, with the result that there is a positional deviation corresponding to one pitch of the male screw between the first and fourth peripheral edge end sections on opposite sides of the first cutout, thereby making it possible for the male screw compliant with the JIS to be threadedly engaged with the engagement hole. The provision of two cutouts in the engagement hole makes it possible for the peripheral edge section to be deformed with high accuracy.

8 Claims, 8 Drawing Sheets

ELECTRONIC DEVICE WITH FEMALE SCREW AND STRUCTURE FOR MOUNTING THE ELECTRONIC DEVICE IN THE INTERIOR OF AN AUTOMOBILE

BACKGROUND OF THE INVENTION

The present invention relates to an electronic device having a female screw that is to be engaged with a male screw compliant with the JIS, DIN or the like, and to a structure for mounting this electronic device in the interior of an automobile.

DESCRIPTION OF THE RELATED ART

FIG. 9 is a sectional view showing an example of a female screw formed in a plate material.

A plate material 1 shown forms a part of a metal chassis, for example, of an in-car electronic device, and consists of a metal plate having a thickness of approximately 0.8 mm. This plate material 1 is fastened to a metal bracket 2 provided on a car body by means of a male screw 3.

Conventionally, a drawn section 1a has been formed on the plate material 1, with a female screw 1b being cut by tapping in the inner peripheral surface of the drawn section 1a. When the metal chassis is fastened to the car body, a male screw 3 that is compliant with the JIS is inserted into a mounting hole 2a of the metal bracket 2 and engaged with the female screw 1b, whereby the plate material 1 and the metal bracket 2 are fastened to each other.

However, when forming the female screw 1b as shown in FIG. 9 in the plate material 1, chips generated during the tapping will fall on the inner side of the plate material 1 and remain there. In the case of an in-car electronic device, a printed circuit board, etc. are often arranged on the inner side of, and in close proximity to, the plate material 1 in which the female screw 1b is formed, with the result that the electronic circuit mounted on the printed circuit board is liable to develop a short circuit due to the chips mentioned above. Further, in the case of an in-car electronic device, a disk driving mechanism, a cassette tape driving mechanism or the like is often arranged inside the metal chassis. If allowed to enter such a driving mechanism, the above-mentioned chips could cause trouble therein.

Further, in the engagement structure shown in FIG. 9, the female screw 1b is formed by tapping after forming a starting hole and the drawn section 1a in the plate material 1, resulting in lots of manhours being required for the machining.

FIGS. 10A and 10B show a female screw structure that can be engaged with a male screw without requiring any tapping. FIG. 10B is a right-hand side view of FIG. 10A, which is a sectional view taken along the line A—A of FIG. 10B.

In this female screw structure, a hole 4 and a cutout 5 are formed in a plate material forming a metal chassis or the like, with the structure being bent in a twisted form such that the peripheral edge section 4a of the hole 4 which is on the right-hand side (as seen in the drawing) is raised toward the viewer as compared with the peripheral edge section 4b which is on the left-hand side. A male screw 6 to be engaged with this hole 4 has roots 6a and crests 6b. When the male screw 6 is turned clockwise, the peripheral edge sections 4a and 4b of the hole 4 are engaged with the roots 6a, thereby effecting threaded engagement of the male screw 6 with the hole.

However, when the twistedly deformed hole 4 as shown in FIG. 10A is formed in the plate material 1, it is necessary for the bottom dimension L in the axial direction of the root 6a to be not less than the thickness T (for example, 0.8 mm) of the plate material 1. Further, the twisted deformation of the hole 4 is effected around the cutout 5 provided at one position in the periphery, that is, a continuous twisted deformation is effected on the peripheral edge sections 4a and 4b, so that the dimensional accuracy in the twisted deformation cannot be very high. Thus, for the male screw 6 to be threadedly engaged with the hole, it is necessary for the bottom dimension L of the roots 6a to be somewhat larger than the plate thickness T, with the result that the pitch P of the crests 6b also has to be relatively large.

However, a male screw having such a large root bottom dimension L is not to be found among the standardized screws compliant with the JIS or the like. Therefore, it is necessary to produce a special male screw 6 intended for the threaded engagement with the plate material 1.

For example, in the case of an in-car acoustic apparatus, male screws are included as attachments for mounting on a metal bracket on the car body. However, the provision of special male screws 6 as attachments results in a high attachment parts cost. Further, if such special male screws 6 get lost, the operation of fixing the plate material cannot be conducted.

SUMMARY OF THE INVENTION

The present invention has been made for with a view toward solving the above problems in the prior art. It is accordingly an object of the present invention to provide an electronic device which has a female screw that need not be formed by tapping in a plate material, such as a metal chassis, which helps to prevent short-circuiting in the electronic circuit due to the chips generated as a result of tapping, and which allows use of standardized screws compliant with the JIS, DIN or the like. The present invention also aims to provide a structure for mounting such an electronic device in the interior of a car.

In accordance with the present invention, there is provided an electronic device having a female screw structure including a cutout formed in a peripheral edge section of a hole formed in a chassis, wherein a continuous deformation is effected on the peripheral edge section such that, of two peripheral edge end sections on one and the other side of the cutout, one peripheral edge end section is positionally deviated in the plate thickness direction by approximately one pitch of a standardized male screw with respect to the other peripheral edge end section.

In accordance with the present invention, there is further provided an electronic device having a female screw structure including a hole formed in a chassis of the electronic device containing an electronic circuit, and first and second cutouts formed in a peripheral edge section of the hole in an angular arrangement of 180°, the peripheral edge section of the hole being deformed such that there is a positional deviation in the plate thickness direction from the first toward the second cutout by approximately one half of the pitch of a standardized male screw and a further positional deviation from the second toward the first cutout by one half of the pitch.

In the above-described structures, when the plate thickness of the chassis is larger than the opening dimension of the roots of the standardized male screw, it is necessary for the peripheral edge section of the hole to be machined into a thin-walled section so that it can get into the gap between the roots of the male screw. This machining can be realized, for example, by effecting C-surface machining on the peripheral edge section of the hole.

Further, there is provided a structure for mounting an electronic device on a bracket provided in the interior of an automobile, the structure having a female screw including a hole formed in a chassis of the electronic device, with a cutout being formed in a peripheral edge section of the hole, the peripheral edge section of the hole being continuously deformed such that, of two peripheral edge end sections on opposite sides of the cutout, one peripheral edge end section is positionally deviated in the plate thickness direction by approximately one pitch of a standardized male screw with respect to the other peripheral edge end section, wherein the male screw is threadedly engaged with this female screw through the intermediation of the bracket.

There is further provided a structure for mounting an electronic device on a bracket provided in the interior of an automobile, the structure having a female screw including a hole formed in a chassis of the electronic device, and first and second cutouts formed in a peripheral edge section of the hole in an angular arrangement of 180°, the peripheral edge section of the hole being deformed such that there is a positional deviation in the plate thickness direction from the first toward the second cutout by approximately one half of the pitch of a standardized male screw and a further positional deviation from the second toward the first cutout by one half of the pitch, wherein the male screw is threadedly engaged with this female screw through the intermediation of the bracket.

The above-described means are constructed such that a standardized male screw can be threadedly engaged with a female screw, which can be formed without tapping in a plate material, such as a metal chassis. Examples of the standardized male screw include a metric coarse screw thread compliant with the JIS (JIS.B.0205), a unified coarse thread compliant with the JIS (JIS.B.0206), and bolts compliant with the JIS.

In the above-described means, a cutout is formed in the peripheral edge section of a hole formed in the chassis of the electronic device and, of the two peripheral edge end sections on opposite sides of the cutout, one peripheral edge end section is positionally deviated in the plate thickness direction by one pitch of a standardized male screw. Thus, the standardized screw can be threadedly engaged with the hole, and there is no need to produce a special male screw.

When using a standardized male screw, it is necessary for the peripheral edge section of the hole to be machined with high dimensional accuracy in accordance with the configuration of the roots of the male screw. In view of this, in the second means described above, first and second cutouts are formed in the peripheral edge section of the hole, and one of the substantially semicircular edge portions continuously extending between the peripheral edge end sections, is deformed such that the peripheral edge end section bordering on the second cutout is spaced away in the plate thickness direction from the peripheral edge end section bordering on the first cutout by approximately one half of the pitch of the male screw. Further, the other semicircular peripheral edge portion continuously extending between the peripheral edge end sections is deformed such that the peripheral edge end section bordering on the first cutout is further positionally deviated from the peripheral edge end section bordering the second cutout. As a result, the peripheral edge end sections on opposite sides of the first cutout are positionally deviated with respect to each other in the plate thickness direction by one pitch, thereby forming a peripheral-edge-section configuration that allows a standardized male screw to be threadedly engaged therewith.

As described above, first and second cutouts are provided in the peripheral edge section of the hole, and a deformation by approximately half a pitch is effected in one of the semicircular peripheral edge portions defined by the two cutouts, and the other semicircular peripheral edge portion is further deformed by half a pitch, whereby it is possible for the peripheral edge section of the hole to be machined with high accuracy in accordance with the helix and the pitch of the roots of the standardized screw. That is, by providing two cutouts, it is possible, for example, to distribute the spring back during the stamping between the two semicircular peripheral edge portions, thereby making it possible to perform a highly accurate pitch machining on the peripheral edge section of the hole.

In the female screw configuration in each of the above-described means, it is a prerequisite that the thickness of the plate material be smaller than the opening dimension in the axial direction of the roots of the male screw that is compliant with the JIS or the like. However, when the plate thickness is larger than the opening dimension, the peripheral edge section of the hole is machined into a thin-walled section, whereby it is possible for the roots of the male screw to be threadedly engaged with the hole. This machining can be realized by C-surface-machining the peripheral edge section of the hole. The C-surface machining consists in bevelling of the peripheral edge section of the plate material at 45° with respect to the end surface. This machining is executed as an ordinary hole bevelling, and can be effected through a very simple machining operation.

However, even when the peripheral edge section of the hole is made thinner by C-surface machining, it is difficult to bend the peripheral edge section exactly by the above-mentioned pitch when the thickness of the plate material is large. Thus, it is desirable for the thickness T of the plate material to be not larger than (P+0.1 mm) with respect to the pitch P of the crests of a standardized screw, such as a metric screw thread compliant with the JIS. It is more desirable that the plate thickness T be not larger than the pitch P of the crests of the screw. When the plate thickness T is beyond this preferable range, it is difficult to deform the peripheral edge section of the hole in accordance with the pitch of the screw.

The female screw formed in the chassis of the electronic device has a cutout formed in the peripheral edge section of the hole, and, of the two peripheral edge end sections on one and the other side of this cutout, one peripheral edge end section is positionally deviated in the plate thickness direction by one pitch of a standardized male screw with respect to the other peripheral edge end section, and this female screw is threadedly engaged with the male screw through the intermediation of a bracket that is provided in the interior of an automobile. Thus, when mounting the electronic device in the interior of a car, a standardized male screw can be used for threaded engagement, so that there is no need to produce a special male screw. Thus, even if the male screw gets lost during the operation of mounting the electronic device, an alternative male screw is easily available.

BRIEF DESCRIPTION OF THE DRAWINGS

Figure 1:
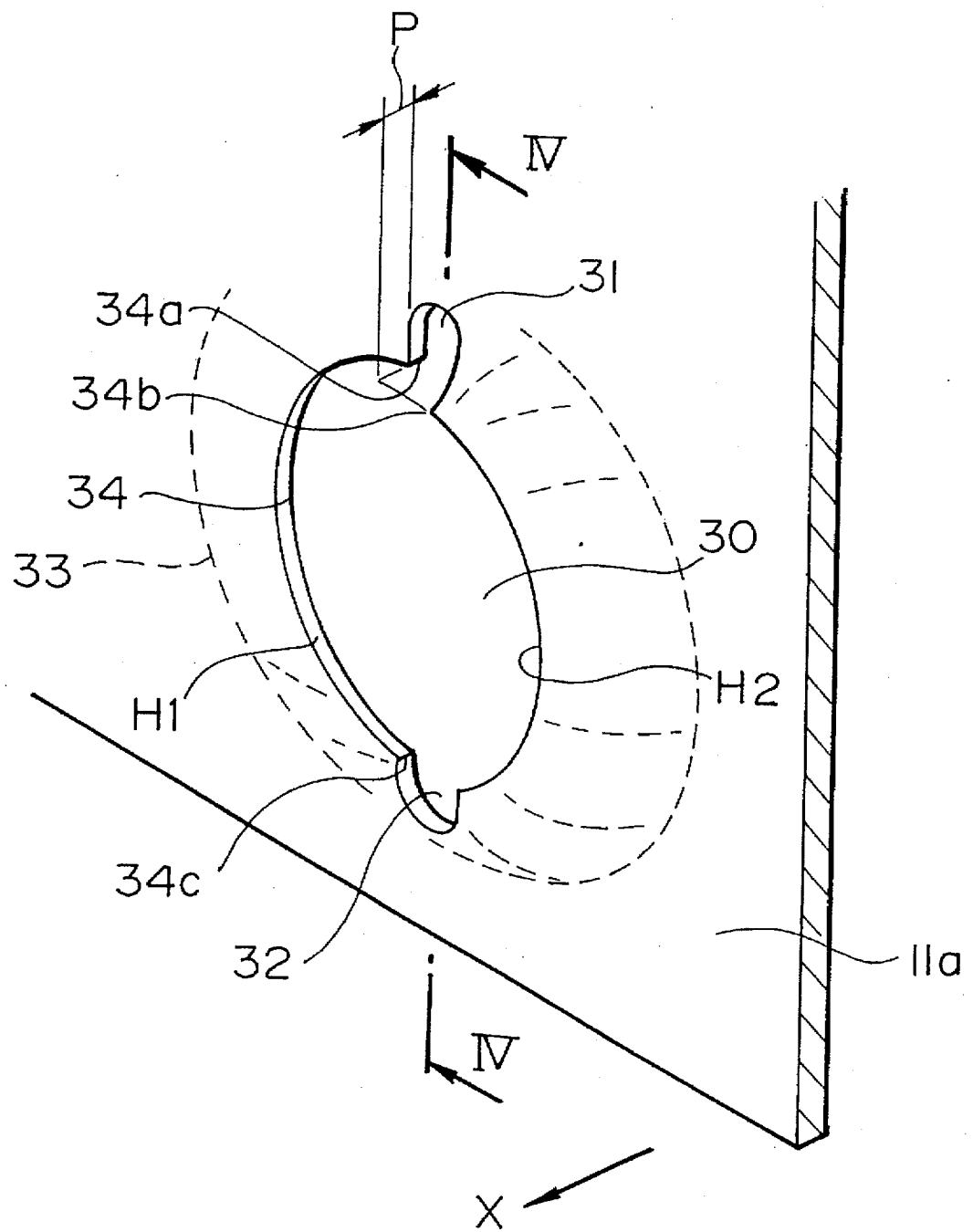
FIG. 1 is an enlarged perspective view of a female screw structure according to an embodiment of the present invention, which is formed in a plate material.

FIG. 5 is an enlarged sectional view taken along the line IV—IV of FIG. 1, showing a female screw for M4;

Figure 6:
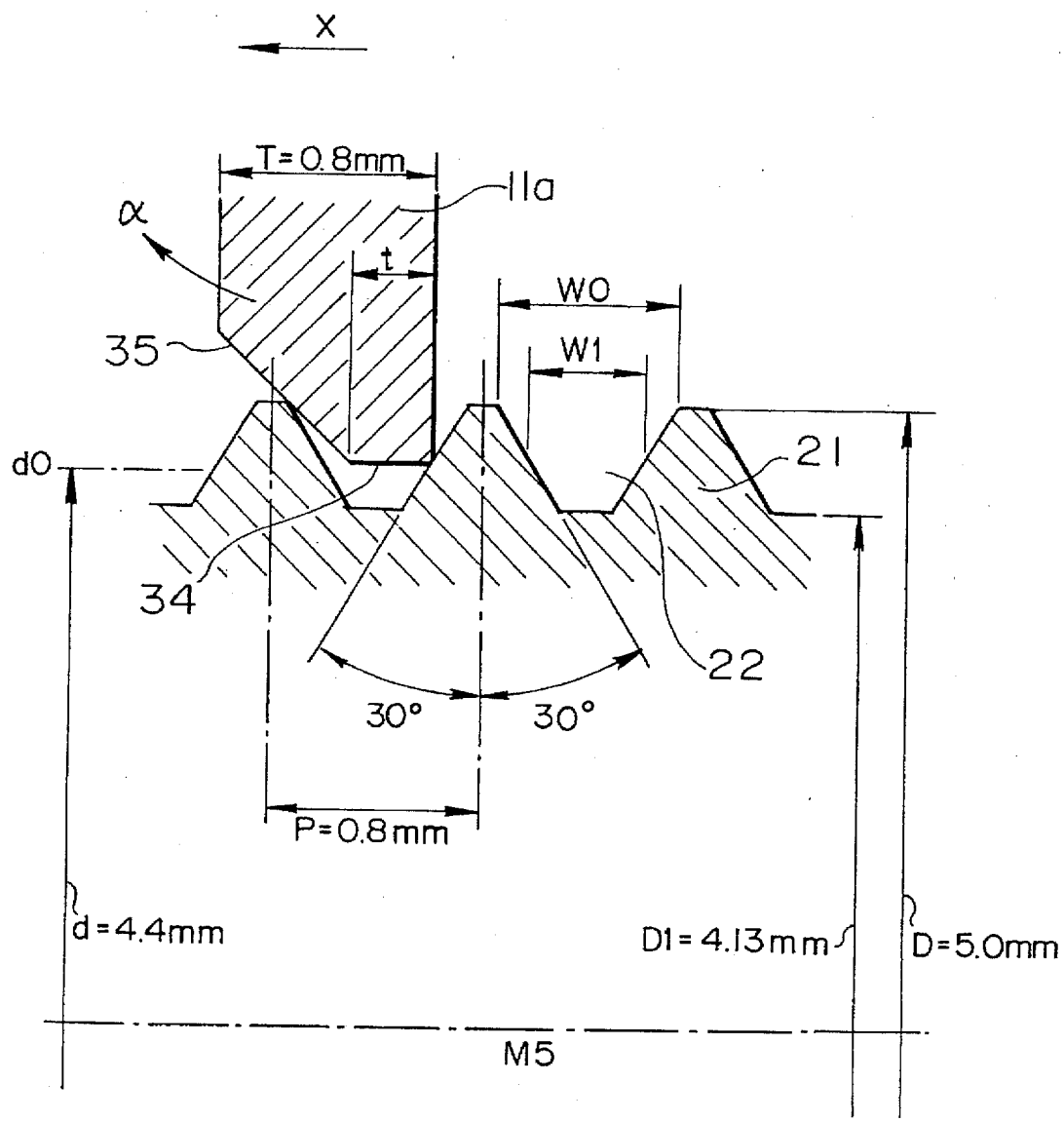
Figure 7:
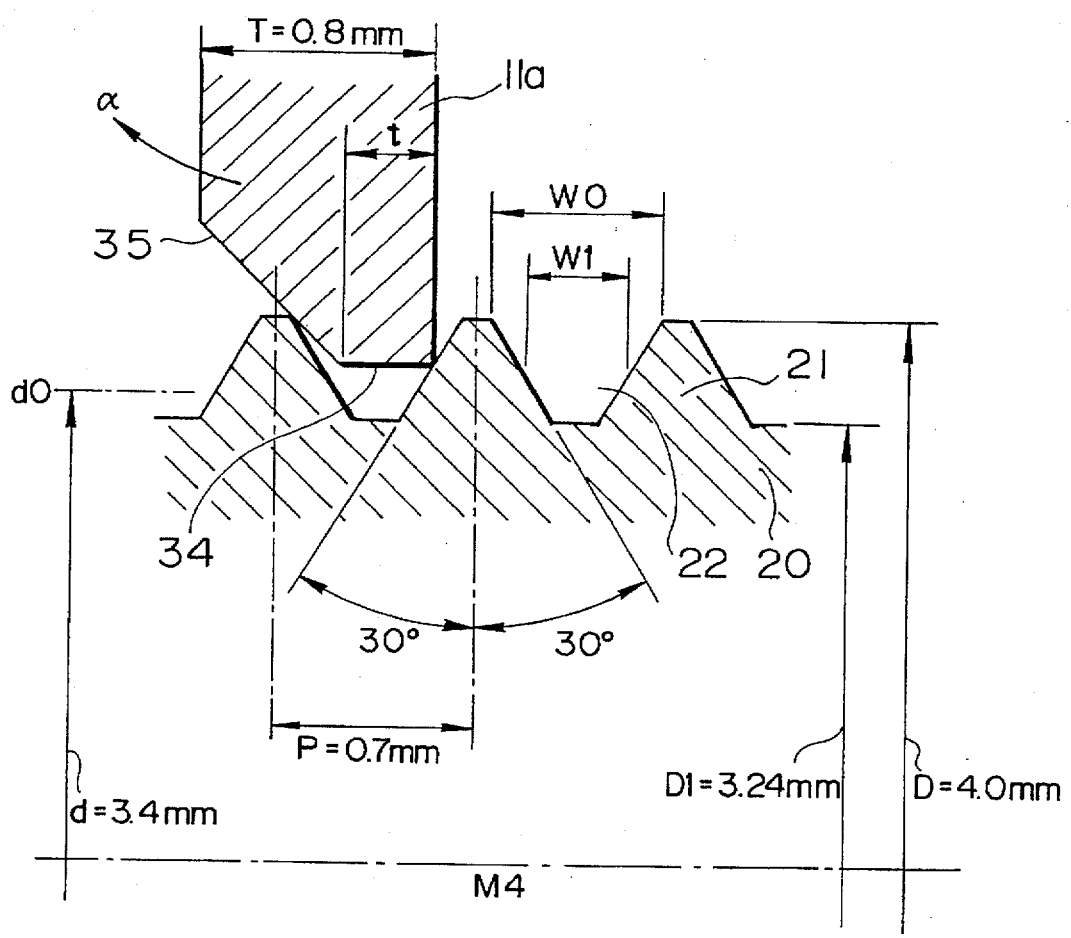
Figure 8:
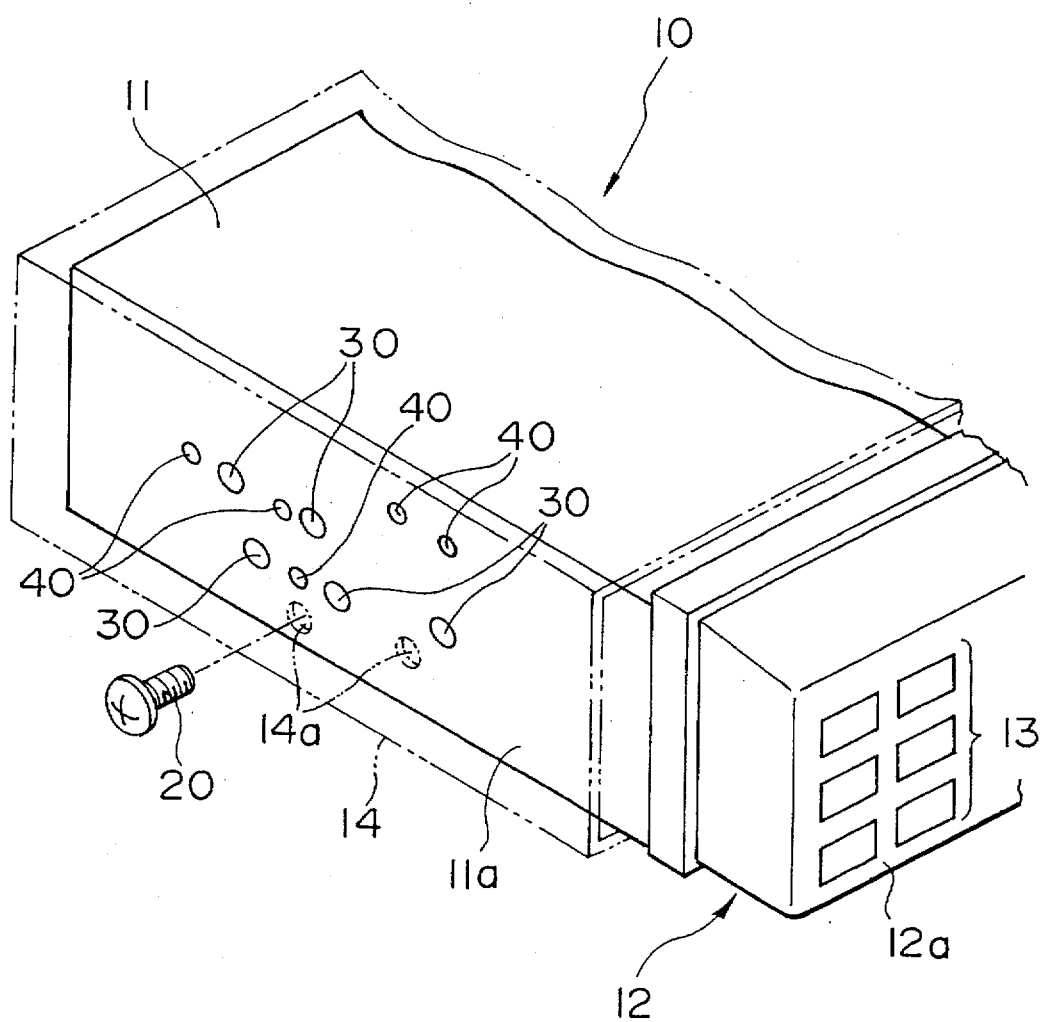
Figure 9:
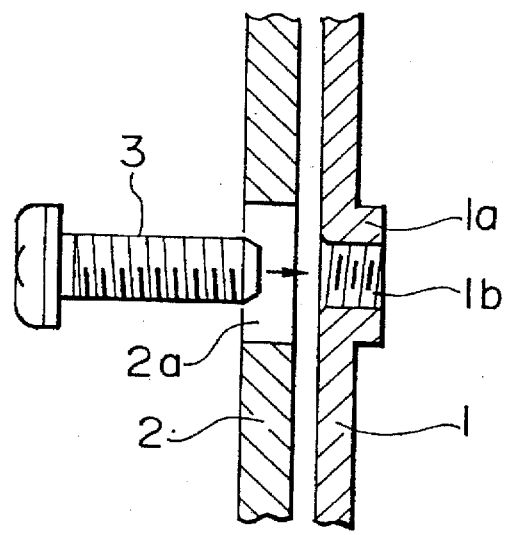
Figure 10A:
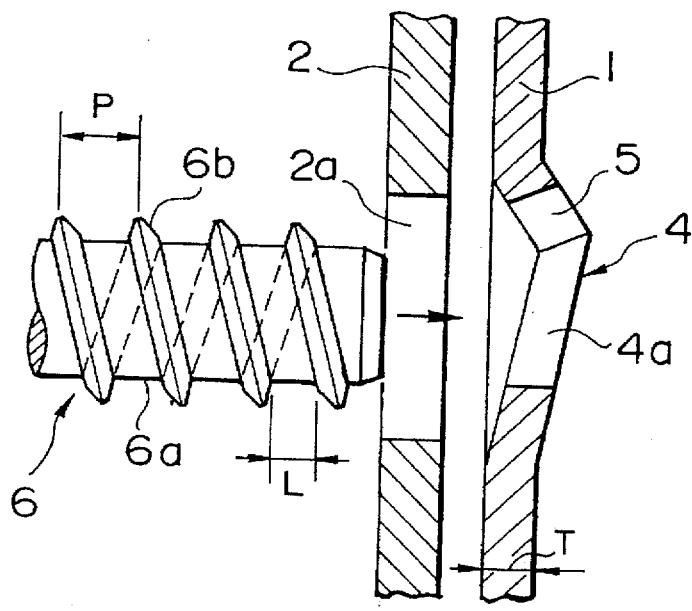
Figure 10B:
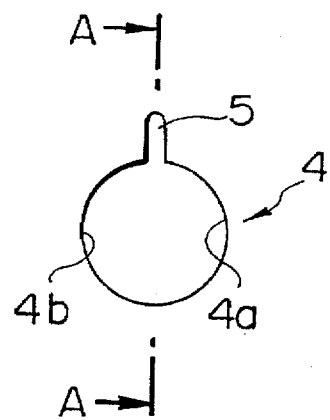

FIG. 6 is an enlarged sectional view showing a female screw for M5 threadedly engaged with an M5 male screw;

FIG. 7 is an enlarged sectional view showing a female screw for M4 threadedly engaged with an M4 male screw;

FIG. 8 is a perspective view showing how a metal chassis of an in-car electronic device and a metal bracket are secured to each other according to an application example of the present invention;

FIG. 9 is a sectional view showing how a conventional female screw formed by tapping is threadedly engaged with a male screw;

FIG. 10A sectional view showing how a female screw of a conventional plate material is threadedly engaged with a special screw; and FIG. 10B is a front view of the female screw.

DESCRIPTION OF THE PREFERRED EMBODIMENT

An embodiment of the present invention will now be described.

FIG. 8 is a perspective view showing an in-car electronic device 10, consisting of a car stereo or the like, as an example of an electronic device to which the female screw structure of the present invention is applicable.

Fastened to this in-car electronic device 10 is a nose section 12 of resin, which is formed at the forward end of a metal chassis 11 and serves as a cosmetic member. The metal chassis 11 is embedded in an accommodating recess formed in a console panel in the interior of an automobile, and the nose section 12 is mounted so as to be exposed on the surface of the console panel. The metal chassis 11 contains a disk driving mechanism, a cassette tape driving mechanism or the like, and further, a printed circuit board on which various electronic circuits are formed. The front surface of the nose section 12 is formed as an operation panel 12a, on which various push-button operating switches are arranged. The operation panel 12a has an inlet opening for a disk, a cassette tape or the like, which opening leads to the driving mechanism mentioned above. Further, the operation panel 12a has a liquid crystal display panel, etc.

A metal bracket 14 is secured in position inside the accommodating recess of the console panel. The metal chassis 11 is inserted into the metal bracket 14. A male screw (a fastening screw) 20 is inserted into one of the mounting holes 14a of the metal bracket 14. The male screw 20 is threadedly engaged with a female screw formed on a side of the metal chassis 11, more specifically, with a engagement hole 30, whereby the in-car electronic device 10 is fastened to the metal bracket 14.

The position of the mounting hole 14a of the metal bracket 14 varies depending on car model. In view of this, a plurality of engagement holes 30 are formed in the metal bracket 14 so that the bracket can be compatible with different car models. Further, the bracket has engagement holes 40 of smaller diameters, which are also formed at a plurality of positions.

The male screw 20 is a standardized one. In this embodiment, it is a metric screw thread compliant with the JIS. The male screw to be threadedly engaged with the engagement holes 30 is an M5 screw, and the male screw to be threadedly engaged with the engagement holes 40 is an M4 screw.

Figure 4:
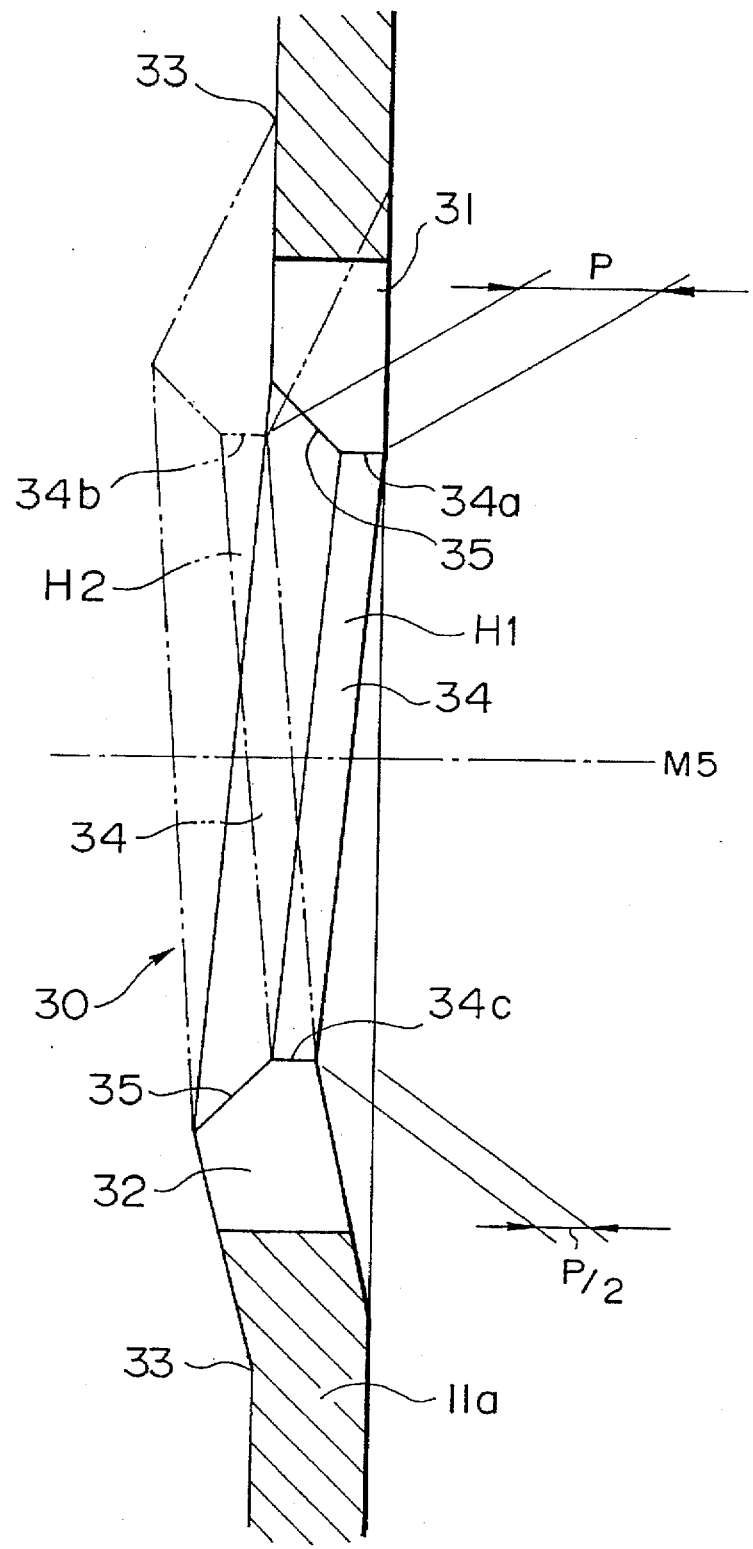
FIG. 4 is an enlarged sectional view taken along the line IV—IV of FIG. 1, showing a female screw for M5.

FIG. 1 is an enlarged perspective view of a female screw for an M5 screw, showing a engagement hole 30 from the inner side of the metal chassis 11. FIG. 4 is an enlarged sectional view taken along the line IV—IV of FIG. 1.

Formed in the peripheral edge section of the engagement hole 30 are first and second cutouts (notches) 31 and 32 which are angularly spaced apart from each other by 180°, with one being situated above the other. The cutouts 31 and 32 are cut in the form of grooves in the direction of the outer diameter of the engagement hole 30. The engagement hole 30 and the portion around it are formed by stamping such that they are raised from the portion corresponding to an arcuate outer diameter line 33 toward the inner side of the metal chassis 11 (the X-direction).

Figure 2A:
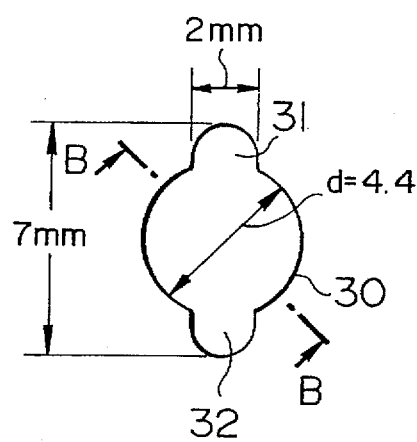
FIG. 2A is a plan view showing a female screw for M5.
Figure 2B:
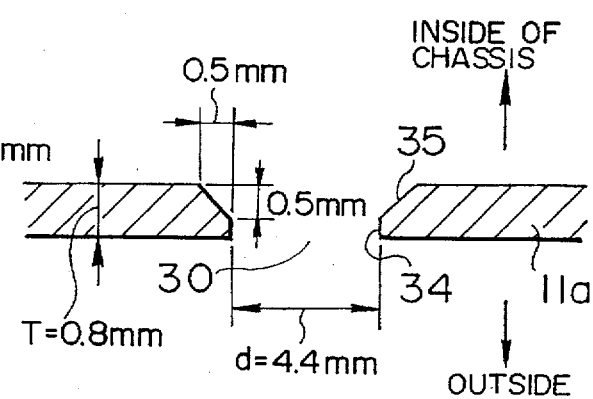
FIG. 2B is a sectional view taken along the line B—B of FIG. 2A.

FIG. 2A shows a plan view of the starting hole of the engagement hole 30 and the cutouts 31 and 32 in the condition prior to the raising, and FIG. 2B shows an enlarged sectional view taken along the line B—B of FIG. 2A.

The engagement hole 30 is intended for threaded engagement with an M5 male screw 20, and is shaped such that its inner diameter before the raising is 4.4 mm or slightly larger than that. The width of the first and second cutouts 31 and 32 is approximately 2 mm, and the distance between the crests of the cutouts 31 and 32 is approximately 7 mm. In FIG. 2B, the upper side as seen in the drawing is the inner side of the metal chassis 11. A plate material (wall) 11a, which forms the metal chassis 11, is a rolled steel plate having a thickness T of 0.8 mm. In this embodiment, the thickness T of the plate material 11a is larger than the root opening dimension (W0 of FIG. 6) of the M5 male screw, so that bevelling 35, consisting of C-surface machining, is effected on the peripheral edge section 34 of the engagement hole 30. That is, a bevelling at 45° giving vertical and horizontal sectional dimensions of 0.5 mm (C 0.5) is performed on that portion of the peripheral edge section 34 which is on the inner side of the chassis. For reasons of graphic representation, this C-surface machining is not shown in FIG. 1.

By the above-described beveling, the peripheral edge section 34 of the engagement hole 30 is formed as a thin-walled section. In this embodiment, the peripheral edge section 34 is machined into a thin-walled section by C-beveling, which can be realized by a simple and ordinary machining.

As shown in FIG. 1, the boundaries between the first cutout 31 and the peripheral edge section 34 of the engagement hole 30 will be referred to as peripheral edge end sections (corners) 34a and 34b. These peripheral edge end sections 34a and 34b are opposed to each other, with the cutout 31 therebetween. As shown in FIGS. 1 and 4, one peripheral edge end section 34a is positioned in substantially the same plane as the plate material 11a, or slightly raised from the plane of the plate material 11a in the direction of the inner side of the chassis (the X-direction), whereas the other peripheral edge end section 34b is positionally deviated with respect to the peripheral edge end section 34a in the plate thickness direction (the X-direction) by a distance that is substantially the same as one pitch of an M5 screw. That is, the peripheral edge end sections 34a and 34b are spaced apart from each other in the X-direction by one pitch (P), the peripheral edge section 34 of the engagement hole 30 being continuously deformed such that the peripheral edge end sections 34a and 34b are positionally deviated by one pitch (P). The terms "substantially the same as" and "approximately" when used in relationship to one pitch or one-half pitch of a standard male screw are used to indicate slight variations caused by removal of a portion of the peripheral edge section 34 to from the cutouts 31.

Peripheral edge end sections 34c and 34d are situated on opposite (first and second) sides of the second cutout 32. In this embodiment, the peripheral edge end section 34c, bordering on the second cutout 32, is positionally deviated by approximately one half of the pitch (P/2) in the plate thickness direction (the X-direction) with respect to the peripheral edge end section 34a, bordering on the first cutout 31. Further, the peripheral edge end section 34b, bordering on the first cutout 31, is positionally deviated in the X-direction by substantially one half of the pitch (P) with respect to the peripheral edge end section 34d, bordering on the second cutout 32.

That is, the substantially semicircular portion (H1) of the peripheral edge section 34 of the engagement hole 30, which extends continuously from the peripheral edge end section 34a to the peripheral edge end section 34c, is continuously deformed in the X-direction so as to form a positional deviation approximately corresponding to one half of the pitch of an M5 male screw between the peripheral edge end section 34a and the peripheral edge end section 34c. Further, the substantially semicircular portion (H2) of the peripheral edge section 34 of the engagement hole 30, which extends continuously from the peripheral edge end section 34d to the peripheral edge end section 34b, is continuously deformed in the X-direction so as to form a positional deviation approximately corresponding to one half of the pitch of an M5 male screw between the peripheral edge end section 34d and the peripheral edge end section 34b. As a result, a positional deviation corresponding to one pitch of an M5 male screw is formed between the peripheral edge end sections 34a and 34b, which are on one and the other side of the first cutout 31.

The above positional deviation is realized by raising the portion on the inner side of the circular outer diameter line 33 in the X-direction. This raising is effected by a single pressure-applying process using a press die. That is, a starting hole for forming the engagement hole 30 and the cutouts 31 and 32, shown in FIGS. 2A and 2B, are formed in the plate material 11a by punching. Then, beveling 35 of C 0.5 is effected thereon before the portion on the inner side of the outer diameter line 33 is deformed through the application of pressure by using a press die. Thus, the configuration shown in FIG. 1 can be easily obtained by stamping, so that it is suitable for mass production. Further, since no tapping is needed, there is no fear of chips falling to remain on the inner side of the metal chassis 11.

As shown in FIG. 8, an M5 male screw 20 is inserted into a mounting hole 14a formed in a metal bracket 14, and is inserted in the X-direction into the engagement hole 30, formed in the plate material 11a of the metal chassis 11, to be threadedly engaged therewith, with the result that the metal chassis 11 is secured to the metal bracket 14.

FIG. 6 is an enlarged sectional view showing how an M5 male screw is threadedly engaged with a female screw equipped with the engagement hole 30.

The crests of the M5 male screw are indicated by numeral 21, and the roots thereof are indicated by numeral 22. The axial opening dimension of the roots 22 is indicated by numeral W0, and the axial opening dimension of the roots 22 as measured at a height corresponding to one half of the height of the crests 21 is indicated by numeral W1. In the case of a metric coarse screw thread, the sectional configuration of the crests 21 and the roots 22 is a 60° triangle (trapezoid). In the case of an M5 screw, the root diameter D1 is 4.13 mm, and the outer diameter D is 5.0 mm. The pitch P of the crests 21 and the roots 22 is 0.8 mm.

The thickness T of the plate material T, in which the engagement hole 30 is formed, is 0.8 mm, which is the same as the pitch P of the screw. In this case, the thickness T of the plate material 11a is larger than the clearance W0 of the roots 22, which means the clearance W0 cannot accommodate the plate. However, since beveling 35 is formed on the peripheral edge section 34 of the engagement hole 30, and the peripheral edge 34 is machined such that it has a small tip thickness (t), the peripheral edge section 34 can be threadedly engaged with the crests 22.

In FIG. 6, the position of the peripheral edge section of an inner diameter d=4.4 mm of the starting hole of the engagement hole 30 is indicated by a diameter line d0. Since the section around the engagement hole 30 is raised toward the inner side of the metal chassis 11 (in the X-direction) as shown in FIG. 1, the position of the end surface of the peripheral edge section 34 of the engagement hole 30 is at a position slightly offset to the outside from the position corresponding to the diameter line d0. Further, while in FIG. 6 that portion of the plate material 11a which is threadedly engaged with the roots 22 is represented in a vertical position, that section of the plate material which is around the engagement hole 30 is actually inclined in the direction indicated by the arrow α in FIG. 6 due to the raising shown in FIG. 1. Therefore, an axial clearance that is somewhat lager than that shown in FIG. 6 is generated between the root 22 of the male screw and the peripheral edge section 34 and the beveled section 35.

As shown in FIGS. 1 and 4, the peripheral edge end sections 34a and 34b on opposite sides of the first cutout 31 are positionally deviated from each other by approximately one pitch (P). Thus, by rotating the male screw which is in the engaged state as shown in FIG. 6 in the fastening direction, the male screw and the engagement hole 30 can be threadedly engaged with each other.

Figure 3A:
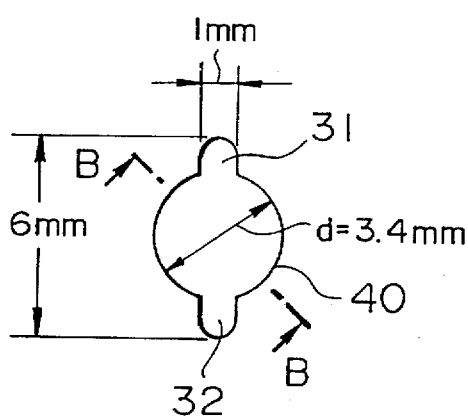
FIG. 3A is a plan view showing a female screw for M4.
Figure 3B:
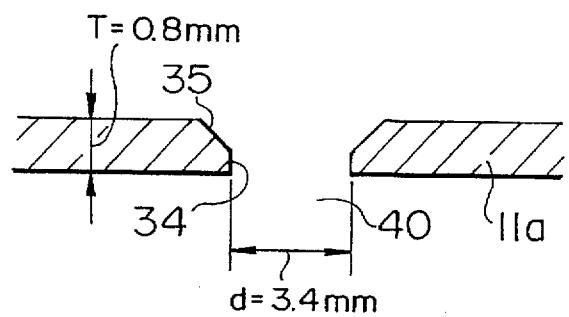
FIG. 3B is a sectional view taken along the line B—B of FIG. 2A.
Figure 5:
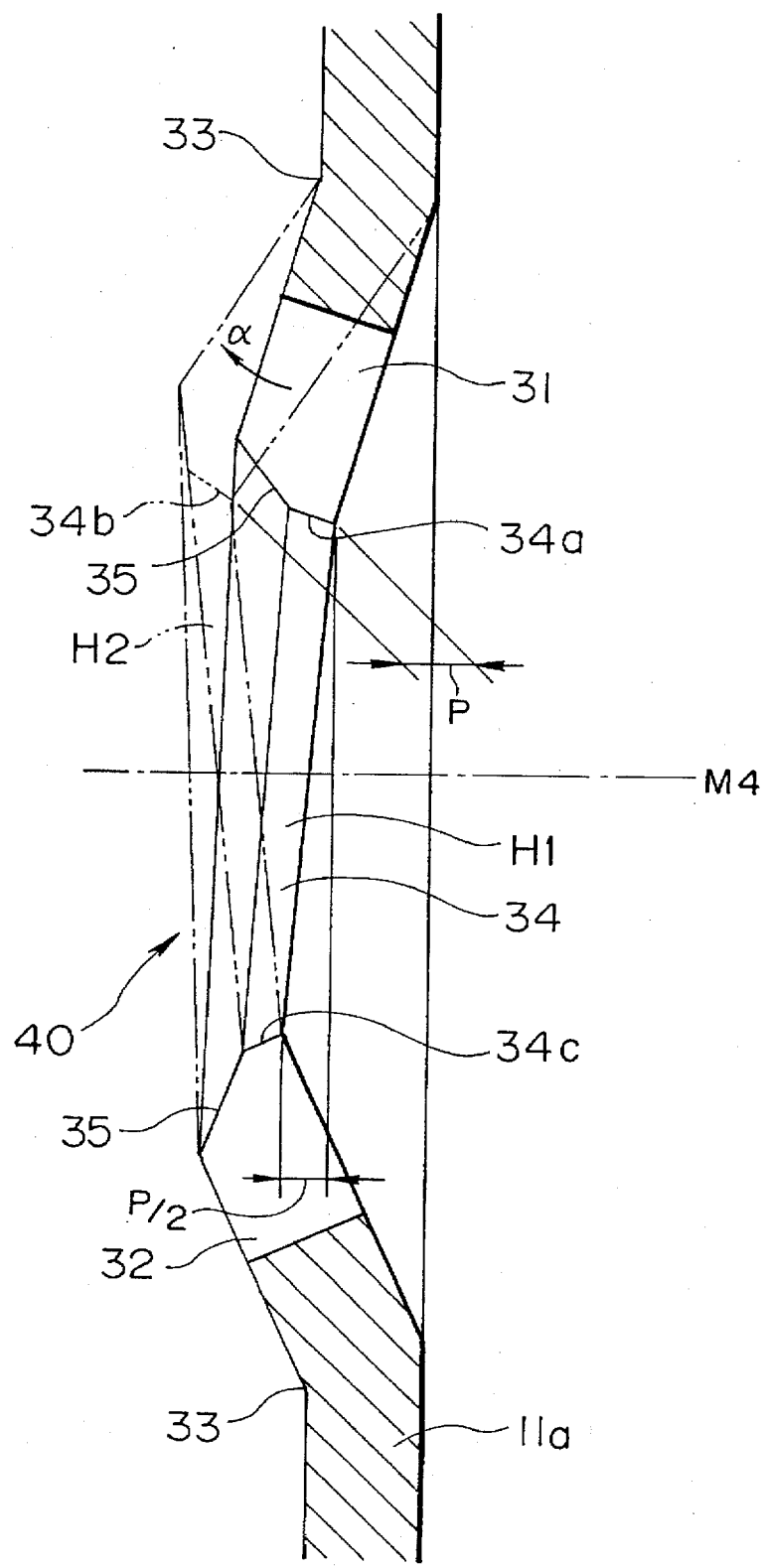

Next, FIG. 8 shows engagement a hole 40, which are to be engaged with an M4 male screw. FIGS. 3A and 3B show the configuration and size of a starting hole for forming the engagement hole 40 and the first and second cutouts 31 and 32; FIG. 5 shows an enlarged sectional view of a female screw equipped with the engagement hole 40; and FIG. 7 shows how a female screw equipped with the engagement hole 40 is threadedly engaged with an M4 male screw.

As shown in FIG. 3, the starting hole of the engagement hole 40 has an inner diameter d of 3.4 mm or somewhat larger than that. The plate material 11a is the same as that described with reference to the engagement hole 30, and has a thickness T of 0.8 mm. Formed on the inner side of the engagement hole 40 is a beveling 35 of C 0.5. The engagement holes 30 and 40 are only different from each other in the inner diameter d of the starting hole and the size of the first and second cutouts 31 and 32. There is no difference in general construction between the engagement holes 30 and 40. Therefore, in FIGS. 3, 5 and 7, the components which are the same as those in FIGS. 2, 4 and 6 are indicated by the same reference numerals.

As shown in FIG. 5, in the case of a female screw for M4 male screws also, a positional deviation corresponding to approximately one half of the pitch of an M4 male screw is provided between the peripheral edge end section 34a bordering on the first cutout 31 and the peripheral edge end section 34c bordering on the second cutout 32. Further, a positional deviation corresponding to approximately one half of the pitch of an M4 male screw is provided between the peripheral edge end section 34d and the peripheral edge end section 34b. As a result, the peripheral edge section 34 is deformed such that there is a positional deviation corresponding to one pitch of M4 in the X direction between the peripheral edge end sections 34a and 34b.

As shown in FIG. 7, in an M4 male screw, the pitch P is 0.7 mm. The root diameter D1 is 3.24 mm, and the outer diameter D is 4.0 mm.

Comparison of FIGS. 7 and 6 shows that the pitch of the M4 male screw (0.7 mm) is smaller than that of the M5 male screw (0.8 mm), whereas the thickness of the plate material 11a is the same (T=0.8 mm), with the same beveling of C 0.5 being effected. Thus, the clearance between the root 22 of the M4 male screw and the engagement hole shown in FIG. 7 is smaller than the clearance in the case of the M5 male screw shown in FIG. 6. In view of this, as shown in FIG. 5, in the engagement hole 40 for M4 screws, the raising amount of the section around the engagement hole, which is raised in the X-direction, is made relatively large, and the amount of deformation in the α-direction of that section of the plate material 11a which is around the engagement hole 40 is made large so as to facilitate the generation of the engagement clearance between the root 22 and the peripheral edge section of the engagement hole.

The female screw shown in FIG. 7 also allows the M4 male screw to be threadedly engaged in the same manner, enabling the metal chassis 11 and the metal bracket 14 to be fastened together by the M4 male screw.

Further, as shown in FIGS. 6 and 7, by effecting beveling 35 to forms the peripheral edge section of the engagement hole into a thin-walled section, it is possible to threadedly engage the peripheral edge section of the engagement hole with the roots 22 of an M5 or M4 male screw even when the plate thickness T is large. However, when the plate thickness is too large, the engagement with the roots of the male screw is difficult even with the beveling 35. Further, an excessively large plate thickness makes the raising of the section around the engagement hole as shown in FIGS. 4 and 5 difficult.

Therefore, as can be seen from FIGS. 6 and 7, when an M4 or M5 male screw is used, it is desirable for the thickness T of the plate material 11a to be not larger than (P+0.1) mm (where P is the pitch of the male screw). It is more desirable for the plate thickness T to be not larger than the pitch P. Further, the dimension t of the end surface (the peripheral surface of the engagement hole) of the peripheral edge section, left after the beveling 35, must not be larger than the opening dimension W0 of the roots 22 of the screw. Further, assuming that the opening dimension of the roots 22 of the screw as measured at a height corresponding to one half of the height of the crests 21 is W1, it is more desirable for the dimension t to be not larger than W1.

When the thickness T of the plate material is not larger than W0 or W1, there is no need to perform the beveling 35, i.e., the machining to form a thin-walled section.

Further, in the embodiment shown, first and second cutouts 31 and 32 are formed in the peripheral edge section of the engagement hole, and each of the substantially semicircular portions (H1) and (H2) on one and the other side of the two cutouts is deformed by one half of the pitch to distribute the spring back during stamping between these sections (H1) and (H2), so that the deformation of the peripheral edge section of the engagement hole can be easily effected, and it is possible to form a peripheral edge section of a highly accurate pitch by stamping.

However, it is also possible to provide only the first cutout 31, without providing the second cutout 32, and deform the the peripheral edge section 34 such that there is a positional deformation corresponding to one pitch in the X-direction between the peripheral edge end sections 34a and 34b on opposite sides of the cutout 31.

The application of the female screw structure of the present invention is not restricted to the use for the purpose of securing the metal chassis 11 of an in-car electronic device in position, but can also be used for the screw fastening when the plate material portion of each electronic device is secured to a chassis, board or the like.

As described above, in accordance with the present invention, a standardized male screw compliant with the JIS, DIN or the like can be threadedly engaged with a plate material, without performing tapping on the plate material.

Further, by forming first and second cutouts in the peripheral edge section of the engagement hole, it is possible for the peripheral edge section of the engagement hole to be machined with high accuracy in accordance with the pitch of a standardized screw.

Further, by performing a machining for forming a thin-walled section, such as C-beveling, it is possible for a standardized male screw to be threadedly engaged with a plate material even when the plate thickness is large.

In addition, when mounting an electronic device in the interior of a car, a standardized male screw can be used for threaded engagement, and there is no need to produce a special male screw, so that, even if the male screw gets lost during the operation of mounting the electronic device, an alternative male screw is easily available.

What is claimed is:

1. The electronic device comprising:
a chassis including a wall, the wall having a thickness measured in a first direction, the wall defining a hole having peripheral edge, the wall also defining a notch formed on the peripheral edge, the notch including an open end intersecting the peripheral edge of the wall at first and second corners;
wherein the peripheral edge of the hole is continuously deformed in the first direction from the first corner to the second corner;
wherein the first corner is deviated from the second corner in the first direction by a predetermined distance corresponding to approximately one pitch of a selected standardized male screw;
wherein the thickness of the wall is larger than the predetermined distance, and the peripheral edge of the hole is machined such that a thickness of the peripheral edge is less than the thickness of the wall; and
wherein the peripheral edge of the hole is machined into a thin-walled section by C-surface machining to thereby form a female screw.

2. The electronic device according to claim 1, wherein the peripheral edge of the hole is machined to form a female screw satisfying the following condition:

$T \leq (P+0.1)$ mm where T is the thickness of the wall, and P is the pitch of the selected standardized male screw.

3. The electronic device according to claim 1, wherein the peripheral edge of the hole is machined to form a female screw satisfying the condition:

$t \leq W0$ where t is the thickness of the peripheral edge, and W0 is ⅛ times the pitch of the selected standardized male screw.

4. The electronic device according to claim 1 wherein the peripheral edge of the hole is machined to form a female screw satisfying the condition:

$$t \leq W1$$

where t is the thickness of the peripheral edge, and W1 is an opening dimension of roots of the selected standard male screw as measured at a height corresponding to one half of a radial distance between the roots and the crests of the male screw.

5. The electronic device comprising:

a chassis including a wall, the wall having a thickness measured in a first direction, the wall defining a hole having peripheral edge, the wall also defining first and second notches formed on opposite sides of the peripheral edge, each of the first and second notches including an open end intersecting the peripheral edge of the wall at opposing corners;

wherein the peripheral edge of the hole is continuously deformed in the first direction from a first corner of the first notch to a first corner of the second notch;

wherein the peripheral edge of the hole is continuously deformed in the first direction from a second corner of the second notch to a second corner of the first notch;

wherein the first corner of the first notch is deviated from the first corner of the second notch in the first direction by a predetermined distance corresponding to approximately one-half of one pitch of a selected standardized male screw, and the second corner of the second notch is deviated from the second corner of the first notch in the first direction by a predetermined distance corresponding to approximately one-half of one pitch of the selected standardized male screw;

wherein the thickness of the wall is larger than the predetermined distance, and the peripheral edge of the hole is machined such that a thickness of the peripheral edge is less than the thickness of the wall; and wherein the peripheral edge of the hole is machined into a thin-walled section by C-surface machining to thereby form a female screw.

6. The electronic device according to claim 5, wherein the peripheral edge of the hole is machined to form a female screw satisfying the following condition:

$$T \leq (P+0.1)$$

where T is the thickness of the wall, and P is the pitch of the selected standardized male screw.

7. The electronic device according to claim 5, wherein the peripheral edge of the hole is machined to form a female screw satisfying the condition:

$$T \leq W0$$

where t is the thickness of the peripheral edge, and W0 is 7/8 times the pitch of the selected standardized male screw.

8. The electronic device according to claim 5, wherein the peripheral edge of the hole is machined to form a female screw satisfying the condition:

$$t \leq W1$$

where t is the thickness of the peripheral edge, and W1 is an opening dimension of roots of the selected standard male screw as measured at a height corresponding to one half of a radial distance between the roots and the crests of the male screw.

* * * * *